US011086564B2

(12) United States Patent
Liu

(10) Patent No.: US 11,086,564 B2
(45) Date of Patent: Aug. 10, 2021

(54) TEMPERATURE CONTROL METHOD, MEMORY STORAGE DEVICE AND MEMORY CONTROL CIRCUIT UNIT

(71) Applicant: PHISON ELECTRONICS CORP., Miaoli (TW)

(72) Inventor: Shao-Hsien Liu, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 64 days.

(21) Appl. No.: 15/788,809

(22) Filed: Oct. 20, 2017

(65) Prior Publication Data
US 2019/0050166 A1 Feb. 14, 2019

(30) Foreign Application Priority Data
Aug. 10, 2017 (TW) ................................. 106127162

(51) Int. Cl.
*G06F 3/06* (2006.01)
*G06F 11/30* (2006.01)
(Continued)

(52) U.S. Cl.
CPC ............ *G06F 3/0659* (2013.01); *G06F 1/206* (2013.01); *G06F 3/061* (2013.01); *G06F 3/0634* (2013.01);
(Continued)

(58) Field of Classification Search
CPC .......................... G06F 11/3058; Y02D 10/00
See application file for complete search history.

(56) References Cited

U.S. PATENT DOCUMENTS 10,216,212 B1 * 2/2019 Gutierrez ........... H05K 7/20836
2010/0023678 A1 * 1/2010 Nakanishi ............... G06F 1/206
711/103
(Continued)

FOREIGN PATENT DOCUMENTS

| CN | 101044445 | 9/2007 |
|----|-----------|--------|
| CN | 101430923 | 5/2009 |

OTHER PUBLICATIONS

"Office Action of Taiwan Counterpart Application," dated Jan. 5, 2018, p. 1-p. 7, in which the listed reference was cited.
(Continued)

*Primary Examiner* — Sean D Rossiter
*Assistant Examiner* — Stephanie Wu
(74) *Attorney, Agent, or Firm* — JCIPRNET

(57) ABSTRACT

A temperature control method is provided according to an exemplary embodiment of the invention. The method includes: sensing a temperature by a temperature sensor and obtaining a temperature value; performing a cooling-down operation based on a first cooling-down level and updating a level parameter to a first level parameter if the temperature value reaches a first threshold value; and performing the cooling-down operation based on a second cooling-down level according to the first level parameter and updating the level parameter to a second level parameter if the temperature value is not less than the first threshold value during a first time range after the cooling-down operation based on the first cooling-down level is performed, and a cooling-down ability of the cooling-down operation performed based on the second cooling-down level is higher than a cooling-down ability of the cooling-down operation performed based on the first cooling-down level.

24 Claims, 9 Drawing Sheets

(51) Int. Cl.
*G06F 1/20* (2006.01)
*G06F 12/02* (2006.01)

(52) U.S. Cl.
CPC .......... *G06F 3/0653* (2013.01); *G06F 3/0679* (2013.01); *G06F 11/3058* (2013.01); *G06F 12/0246* (2013.01); *G06F 3/0616* (2013.01); *Y02D 10/00* (2018.01)

(56) References Cited

U.S. PATENT DOCUMENTS

| | | | |
|---|---|---|---|
| 2010/0228906 A1* | 9/2010 | Ramiya Mothilal | ........................ G06F 12/0246 711/103 |
| 2012/0110352 A1* | 5/2012 | Branover | .............. G06F 1/3296 713/300 |
| 2013/0073096 A1* | 3/2013 | Brey | .................. H05K 7/20836 700/282 |
| 2014/0326442 A1* | 11/2014 | Kurpiewski | ............. H02K 9/00 165/287 |
| 2016/0266640 A1 | 9/2016 | Kurosawa et al. | |
| 2016/0320971 A1* | 11/2016 | Postavilsky | ........... G06F 3/0604 |
| 2017/0249091 A1* | 8/2017 | Hodes | ..................... G06F 1/206 |
| 2018/0284857 A1* | 10/2018 | Yang | ....................... G11C 16/32 |
| 2018/0364934 A1* | 12/2018 | Bahirat | ................. G06F 3/0634 |
| 2018/0364948 A1* | 12/2018 | Shan | ................... G06F 16/2365 |
| 2019/0050153 A1* | 2/2019 | Yang | .................... G06F 3/0613 |

OTHER PUBLICATIONS

"Office Action of China Counterpart Application", dated Apr. 3, 2016, p. 1-p. 17.

* cited by examiner

TEMPERATURE CONTROL METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 106127162, filed on Aug. 10, 2017. The entirety of the above-mentioned patent application is hereby incorporated by reference herein and made a part of this specification.

BACKGROUND

Technical Field

The invention relates to a memory management technique, and more particularly, to a temperature control method, a memory storage device and a memory control circuit unit.

Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., flash memory) ideal to be built in the portable multi-media devices as cited above.

When reading or writing data for a long time, temperature of the memory storage device may gradually increase. To prevent performance of the memory storage device from being affected by high temperature and prevent the device from damages, the memory storage device may be in-built with a temperature control mechanism. In general, a common temperature control mechanism is configured with a plurality of temperature ranges. Each temperature range corresponds to one fixed cooling-down mechanism. When temperature of the memory storage device is raised to fall within one specific temperature range, the cooling-down mechanism corresponding to that specific temperature range will be activated to attempt reducing temperature of the memory storage device. When temperature of the memory storage device is further raised to fall within another temperature range, the next cooling-down mechanism corresponding to that another temperature range will then be activated. In this way, temperature of the memory storage device may be gradually reduced.

However, as type of the memory storage device and/or control chip gradually increases in numbers, different memory storage devices and/or control chips may have different temperature tolerances. For the memory storage devices and/or control chips with higher temperature tolerances, the temperature bearable by the device is higher. For the memory storage devices and/or control chips with lower temperature tolerances, the temperature bearable by the device is lower. For those different memory storage devices and/or control chips with the different temperature tolerances, if the fixed cooling-down mechanism is provided by using a traditional temperature level division, it is unable to provide the optimal temperature control parameter for each device.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

An exemplary embodiment of the invention provides a temperature control method, a memory storage device and a memory control circuit unit, which are capable of determining whether to continuously raise a cooling-down level of a cooling-down operation according to a comparison result between a detected temperature value and one threshold value, so as to improve the temperature control mechanism for the memory storage device.

An exemplary embodiment of the invention provides a temperature control method for a memory control circuit unit. The memory control circuit unit is configured to control a rewritable non-volatile memory module. The temperature control method includes: sensing a temperature by a temperature sensor and obtaining a temperature value; performing a cooling-down operation based on a first cooling-down level and updating a level parameter to a first level parameter if the temperature value reaches a first threshold value, wherein the first level parameter corresponds to the first cooling-down level; and changing, according to the first level parameter, to perform the cooling-down operation based on a second cooling-down level and updating the level parameter from the first level parameter to a second level parameter if the temperature value is not reduced to being less than the first threshold value during a first time range after the cooling-down operation is performed based on the first cooling-down level, wherein the second level parameter corresponds to the second cooling-down level, wherein a cooling-down ability of the cooling-down operation performed based on the second cooling-down level is higher than a cooling-down ability of the cooling-down operation performed based on the first cooling-down level.

Another exemplary embodiment of the invention provides a memory storage device, which includes a connection interface unit, a rewritable non-volatile memory module, a temperature sensor and a memory control circuit unit. The connection interface unit is configured to couple to a host system. The memory control circuit unit is coupled to the connection interface unit, the rewritable non-volatile memory module and the temperature sensor. The memory control circuit unit is configured to sense a temperature by the temperature sensor and obtain a temperature value. The memory control circuit unit is further configured to perform a cooling-down operation based on a first cooling-down level and update a level parameter to a first level parameter if the temperature value reaches a first threshold value, wherein the first level parameter corresponds to the first cooling-down level. The memory control circuit unit is further configured to change, according to the first level parameter, to perform the cooling-down operation based on a second cooling-down level and update the level parameter from the first level parameter to a second level parameter if the temperature value is not reduced to being less than the first threshold value during a first time range after the cooling-down operation is performed based on the first cooling-down level, wherein the second level parameter corresponds to the second cooling-down level, wherein a cooling-down ability of the cooling-down operation performed based on the second cooling-down level is higher than a cooling-down ability of the cooling-down operation performed based on the first cooling-down level.

Another exemplary embodiment of the invention provides a memory control circuit unit, which is configured to control a rewritable non-volatile memory module. The memory control circuit unit includes a host interface, a memory interface, a temperature sensor and a memory management circuit. The host interface is configured to couple to a host system. The memory interface is configured to couple to a rewritable non-volatile memory module. The memory management circuit is coupled to the host interface, the memory interface and the temperature sensor. The memory management circuit is configured to sense a temperature by the temperature sensor and obtain a temperature value. The memory management circuit is further configured to perform a cooling-down operation based on a first cooling-down level and update a level parameter to a first level parameter if the temperature value reaches a first threshold value, wherein the first level parameter corresponds to the first cooling-down level. The memory management circuit is further configured to change, according to the first level parameter, to perform the cooling-down operation based on a second cooling-down level and update the level parameter from the first level parameter to a second level parameter if the temperature value is not reduced to being less than the first threshold value during a first time range after the cooling-down operation is performed based on the first cooling-down level, wherein the second level parameter corresponds to the second cooling-down level, wherein a cooling-down ability of the cooling-down operation performed based on the second cooling-down level is higher than a cooling-down ability of the cooling-down operation performed based on the first cooling-down level.

Based on the above, a temperature value may be obtained according to a sensing result of the temperature sensor. If the temperature value reaches the first threshold value, the cooling-down operation corresponding to the first level parameter may be performed based on the first cooling-down level. Later, if the temperature value is not reduced to being less than the first threshold value during the first time range, the cooling-down operation corresponding to the second level parameter may be performed based on the second cooling-down level according to the first level parameter. As a result, the cooling-down ability of the memory storage device may be gradually raised according to the comparison result between the temperature value and one specific threshold value. In comparison with the conventional cooling-down mechanism which is correspondingly adjusted according to the divided temperature ranges, the invention can provide a more flexible temperature control.

To make the above features and advantages of the disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
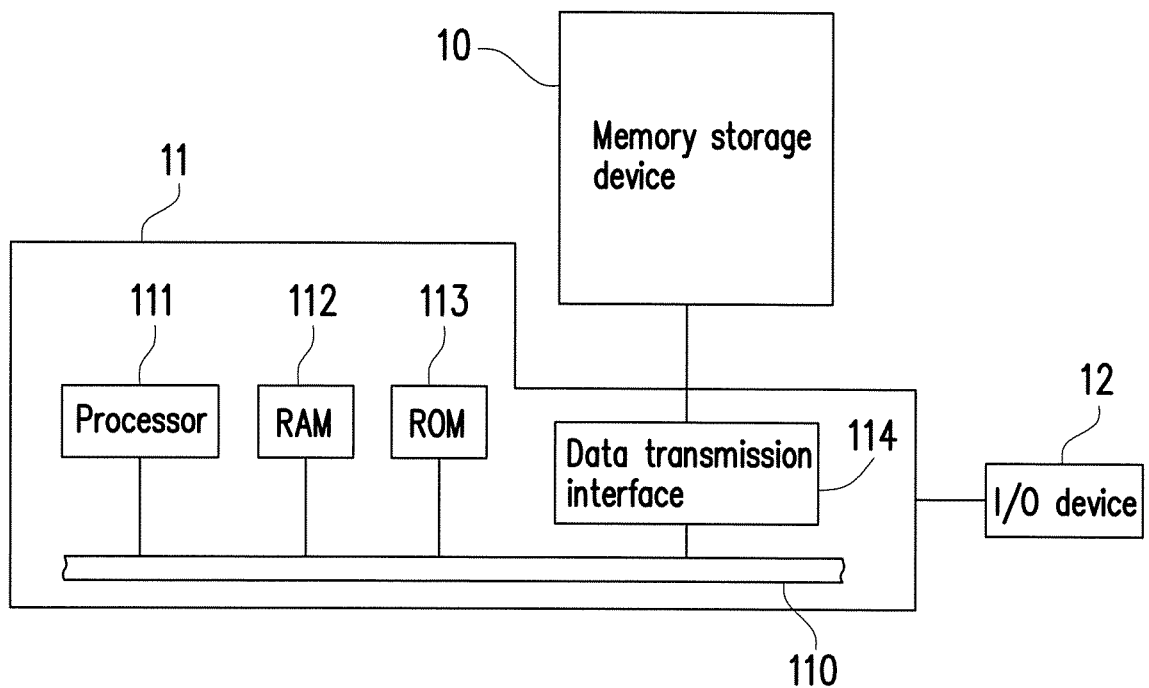
FIG. 1 is a schematic diagram illustrating a host system, a memory storage device and an I/O (input/output) device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage device (a.k.a. a memory storage system) includes a rewritable non-volatile memory module and a controller (a.k.a. a control circuit). The memory storage device usually operates together with a host system so the host system can write data into the memory storage device or read data from the memory storage device.

Figure 2:
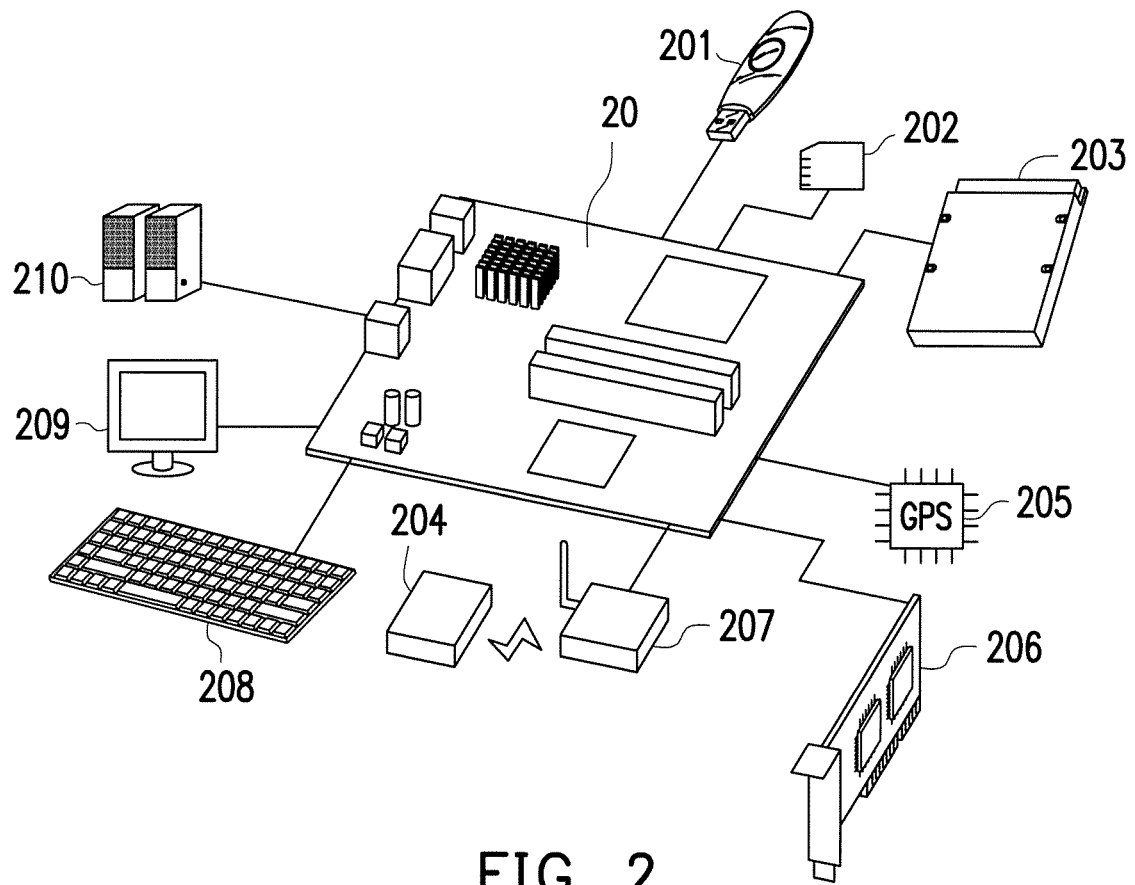
FIG. 2 is a schematic diagram illustrating a host system, a memory storage device and an I/O device according to another exemplary embodiment of the invention.

FIG. 1 is a schematic diagram illustrating a host system, a memory storage device and an I/O (input/output) device according to an exemplary embodiment of the invention. FIG. 2 is a schematic diagram illustrating a host system, a memory storage device and an I/O device according to another exemplary embodiment of the invention.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In the present exemplary embodiment, the host system 11 is coupled to a memory storage device 10 through the data transmission interface 114. For example, the host system 11 can store data into the memory storage device 10 or read data from the memory storage device 10 through the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In the present exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 10 in wired or wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
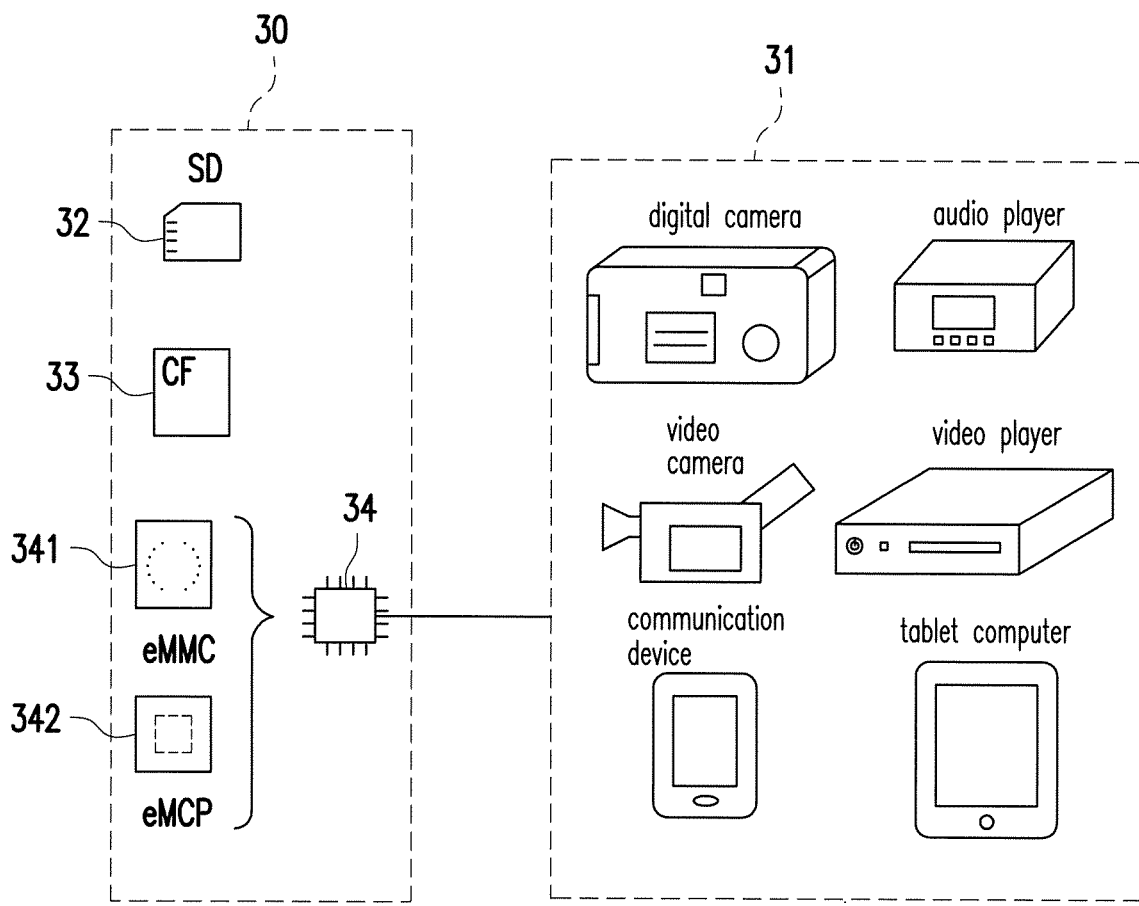
FIG. 3 is a schematic diagram illustrating a host system and a memory storage device according to another exemplary embodiment of the invention.

In an exemplary embodiment, aforementioned host system may be any system capable of substantially cooperating with the memory storage device for storing data. Although the host system is illustrated as a computer system in the foregoing exemplary embodiments, nonetheless, FIG. 3 is a schematic diagram illustrating a host system and a memory storage device according to another exemplary embodiment of the invention. Referring to FIG. 3, in another exemplary embodiment, a host system 31 may also be a system such as a digital camera, a video camera, a communication device, an audio player, a video player or a tablet computer, whereas a memory storage device 30 may be various non-volatile memory storage devices used by the host system 31, such as a SD (Secure Digital) card 32, a CF (Compact Flash) card 33 or an embedded storage device 34. The embedded storage device 34 includes various embedded storage devices capable of directly coupling a memory module onto a substrate of the host system, such as an eMMC (embedded Multi Media Card) 341 and/or an eMCP (embedded Multi Chip Package) storage device 342.

Figure 4:
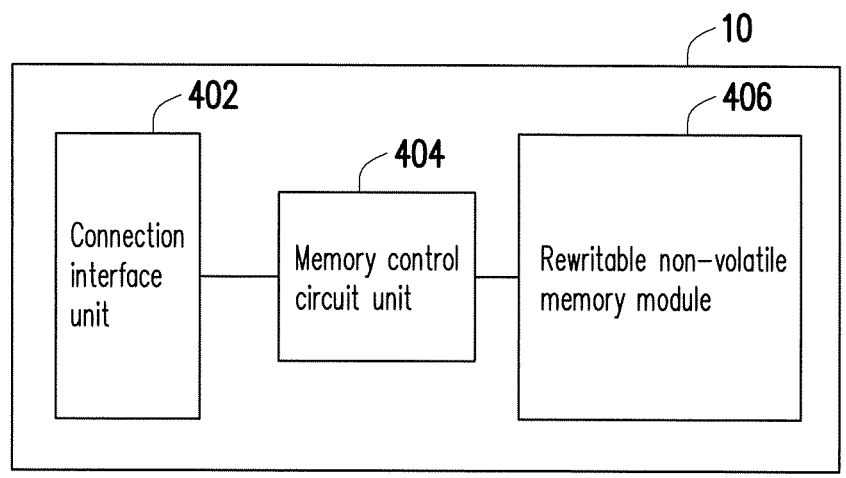
FIG. 4 is a schematic block diagram illustrating a memory storage device according to an exemplary embodiment of the invention.

FIG. 4 is a schematic block diagram illustrating a memory storage device according to an exemplary embodiment of the invention.

Referring to FIG. 4, the memory storage device 10 includes a connection interface unit 402, a memory control circuit unit 404 and a rewritable non-volatile memory module 406.

The connection interface unit 402 is configured to couple to the memory storage device 10 to the host system 11. In the present exemplary embodiment, the connection interface unit 402 is compatible with a SATA (Serial Advanced Technology Attachment) standard. Nevertheless, it should be understood that the invention is not limited to the above. The connection interface unit 402 may also be compatible with a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a MCP interface standard, a MMC interface standard, an eMMC interface standard, a UFS (Universal Flash Storage) interface standard, an eMCP interface standard, a CF interface standard, an IDE (Integrated Device Electronics) interface standard or other suitable standards. The connection interface unit 402 and the memory control circuit unit 404 may be packaged into one chip, or the connection interface unit 402 may be distributed outside of a chip containing the memory control circuit unit 404.

The memory control circuit unit 404 is configured to execute a plurality of logic gates or control commands which are implemented in a hardware form or in a firmware form and perform operations, such as writing, reading or erasing data in the rewritable non-volatile memory module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), other flash memory modules or any memory module having the same features.

In the rewritable non-volatile memory module 406, one or more bits are stored by changing a voltage (hereinafter, also known as a threshold voltage) of each of the memory cells. More specifically, in each of the memory cells, a charge trapping layer is provided between a control gate and a channel. Amount of electrons in the charge trapping layer may be changed by applying a write voltage to the control gate thereby changing the threshold voltage of the memory cell. This operation of changing the threshold voltage of the memory cell is also known as "writing data into the memory cell" or "programming the memory cell". Each of the memory cells in the rewritable non-volatile memory module 406 has a plurality of storage states depended on changes in the threshold voltage. The storage state to which the memory cell belongs may be determined by applying a read voltage to the memory cell, so as to obtain the one or more bits stored in the memory cell.

In the present exemplary embodiment, the memory cells of the rewritable non-volatile memory module 406 constitute a plurality of physical programming units, and the physical programming units constitute a plurality of physical erasing units. Specifically, the memory cells on the same word line constitute one or more of the physical programming units. If each of the memory cells can store more than one bit, the physical programming units on the same word line can be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. In general, in the MLC NAND flash memory, a writing speed of the lower physical programming unit is higher than a writing speed of the upper physical programming unit, and/or a reliability of the lower physical programming unit is higher than a reliability of the upper physical programming unit.

In the present exemplary embodiment, the physical programming unit is the minimum unit for programming. That is, the physical programming unit is the minimum unit for writing data. For example, the physical programming unit is a physical page or a physical sector. When the physical programming unit are the physical page, these physical programming units usually include a data bit area and a redundancy bit area. The data bit area includes multiple physical sectors configured to store user data, and the redundant bit area is configured to store system data (e.g., management data such as an error correcting code, etc.). In the present exemplary embodiment, the data bit area includes 32 physical sectors, and a size of each physical sector is 512 bytes (B). However, in other exemplary embodiments, the data bit area may also include 8, 16 physical sectors or different number (more or less) of the physical sectors, and the size of each physical sector may also be greater or smaller. On the other hand, the physical erasing unit is the minimum unit for erasing. Namely, each physical erasing unit contains the least number of memory cells to be erased together. For instance, the physical erasing unit is a physical block.

Figure 5:
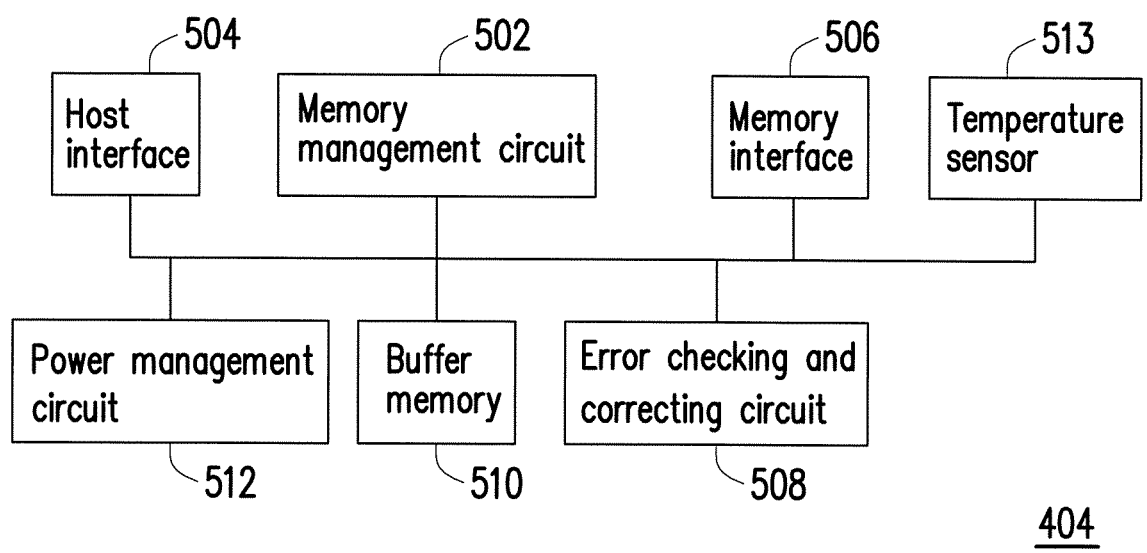
FIG. 5 is a schematic block diagram illustrating a memory control circuit unit according to an exemplary embodiment of the invention.

FIG. 5 is a schematic block diagram illustrating a memory control circuit unit according to an exemplary embodiment of the invention.

Referring to FIG. 5, the memory control circuit unit 404 includes a memory management circuit 502, a host interface 504, a memory interface 506 and a temperature sensor 513.

The memory management circuit 502 is configured to control overall operations of the memory control circuit unit 404. Specifically, the memory management circuit 502 has a plurality of control commands and the control commands are executed to perform various operations such as writing, reading and erasing data during operation of the memory storage device 10. Hereinafter, operation of the memory management circuit 502 is described as equivalent to the operation of the memory control circuit unit 404.

In the present exemplary embodiment, the control commands of the memory management circuit 502 are implemented in a firmware form. For instance, the memory management circuit 502 has a microprocessor unit (not illustrated) and a ROM (not illustrated), and the control commands are burned into the ROM. When the memory storage device 10 operates, the control commands are executed by the microprocessor to perform operations of writing, reading or erasing data.

In another exemplary embodiment, the control commands of the memory management circuit 502 may also be stored as program codes in a specific area (for example, the system area in a memory exclusively used for storing system data) of the rewritable non-volatile memory module 406. In addition, the memory management circuit 502 has a microprocessor unit (not illustrated), the read only memory (not illustrated) and a random access memory (not illustrated). More particularly, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to perform operations, such as writing, reading or erasing data.

Further, in another exemplary embodiment, the control commands of the memory management circuit 502 may also be implemented in a form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of the rewritable non-volatile memory module 406 or a group thereof. The memory writing circuit is configured to give a write command sequence for the rewritable non-volatile memory module 406 in order to write data into the rewritable non-volatile memory module 406. The memory reading circuit is configured to give a read command sequence for the rewritable non-volatile memory module 406 in order to read data from the rewritable non-volatile memory module 406. The memory erasing circuit is configured to give an erase command sequence for the rewritable non-volatile memory module 406 in order to erase data from the rewritable non-volatile memory module 406. The data processing circuit is configured to process both the data to be written into the rewritable non-volatile memory module 406 and the data read from the rewritable non-volatile memory module 406. Each of the write command sequence, the read command sequence and the erase command sequence may include one or more program codes or command codes, and instruct the rewritable non-volatile memory module 406 to perform the corresponding operations, such as writing, reading and erasing. In an exemplary embodiment, the memory management circuit 502 may further give command sequence of other types to the rewritable non-volatile memory module 406 for instructing to perform the corresponding operations.

The host interface 504 is coupled to the memory management circuit 502 and configured to receive and identify commands and data sent from the host system 11. In other words, the commands and data transmitted by the host system 11 are transmitted to the memory management circuit 502 via the host interface 504. In the present exemplary embodiment, the host interface 504 is compatible with the SATA standard. Nevertheless, it should be understood that the invention is not limited to the above. The host interface 504 may also compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 sends corresponding command sequences. For example, the command sequences may include the write command sequence which instructs to write data, the read command sequence which instructs to read data, the erase command sequence which instructs to erase data, and other corresponding command sequences for instructing to perform various memory operations (e.g., changing read voltage levels or performing a garbage collection operation). These command sequences are generated by the memory management circuit 502 and transmitted to the rewritable non-volatile memory module 406 through the memory interface 506, for example. The command sequences may include one or more signals, or data transmitted in the bus. The signals or the data may include command codes and program codes. For example, information such as identification codes and memory addresses are included in the read command sequence.

The temperature sensor 513 is coupled to the memory management circuit 502 and configured to sense a temperature. For example, the sensed temperature may be the temperature of the memory control circuit unit 404 and/or the rewritable non-volatile memory module 406. The temperature sensor 513 may be various temperature sensors, such as a thermocouple temperature sensor, a resistance temperature sensor, a thermistor temperature sensor and a semiconductor temperature sensor. The number of the temperature sensor 513 may be one or more. A deployed position of the temperature sensor 513 may be located at places inside the memory control circuit unit 404, outside the memory control circuit unit 404, inside the rewritable non-volatile memory module 406 or outside the rewritable non-volatile memory module 406, which are not particularly limited by the invention.

In an exemplary embodiment, the memory control circuit unit 404 further includes an error checking and correcting circuit 508, a buffer memory 510 and a power management circuit 512.

The error checking and correcting circuit 508 is coupled to the memory management circuit 502 and configured to perform an error checking and correcting operation to ensure the correctness of data. Specifically, when the memory management circuit 502 receives the write command from the host system 11, the error checking and correcting circuit 508 generates an ECC (error correcting code) and/or an EDC (error detecting code) for data corresponding to the write command, and the memory management circuit 502 writes data corresponding to the write command and the corresponding ECC and/or the EDC into the rewritable non-volatile memory module 406. Then, when the memory management circuit 502 reads the data from the rewritable non-volatile memory module 406, the corresponding ECC and/or the EDC are also read, and the error checking and correcting circuit 508 performs the error checking and correcting operation on the read data based on the ECC and/or the EDC.

The buffer memory 510 is coupled to the memory management circuit 502 and configured to temporarily store data and commands from the host system 11 or data from the rewritable non-volatile memory module 406. The power management unit 512 is coupled to the memory management circuit 502 and configured to control a power of the memory storage device 10.

Figure 6:
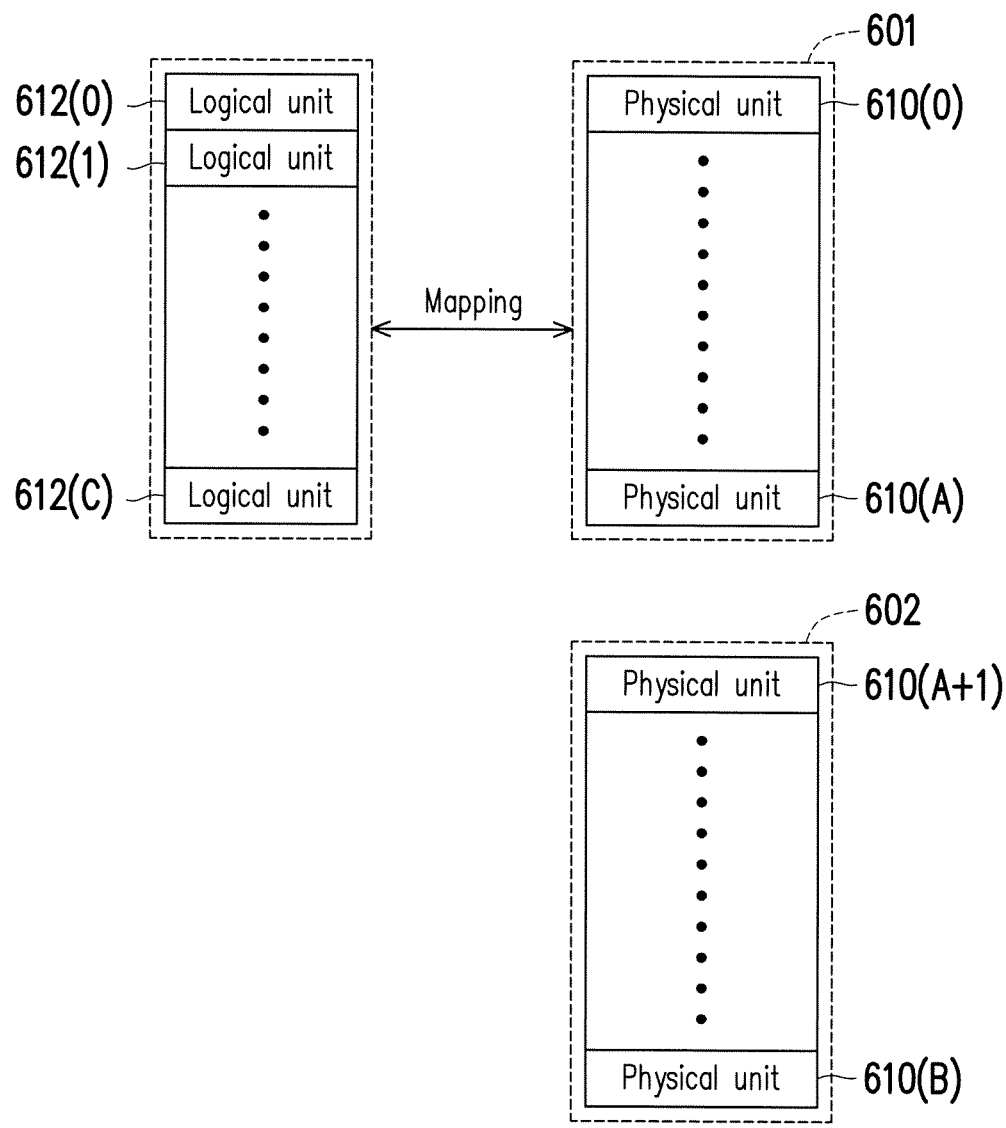
FIG. 6 is a schematic diagram illustrating management of a rewritable non-volatile memory module according to an exemplary embodiment of the invention.

FIG. 6 is a schematic diagram illustrating management of a rewritable non-volatile memory module according to an exemplary embodiment of the invention.

Referring to FIG. 6, the memory management circuit 502 logically groups physical units 610(0) to 610(B) of the rewritable non-volatile memory module 406 into a storage area 601 and a replacement area 602. The physical units 610(0) to 610(A) in the storage area 601 are configured to store data, and the physical units 610(A+1) to 610(B) in the replacement area 602 are configured to replace damaged physical units in the storage area 601. For example, if data read from one specific physical unit includes too many errors and these errors cannot be corrected, the specific physical unit is treated as a damaged physical unit. It should be noted that, if there are no available physical erasing units in the replacement area 602, the memory management circuit 502 may declare the memory storage device 10 as in a write protect state so data can no longer be written thereto.

In the present exemplary embodiment, each physical unit refers to one physical erasing unit. However, in another exemplary embodiment, one physical unit may also refer to one physical address, one physical programming unit, or a composition of a plurality of continuous or discontinuous physical addresses. The memory management circuit 502 assigns logical units 612(0) to 612(C) for mapping to the physical units 610(0) to 610(A) in the storage area 601. In the present exemplary embodiment, each logical unit refers to one logical address. However, in another exemplary embodiment, each logical unit may also refer to one logical programming unit, one logical erasing unit or a composition of a plurality of continuous or discontinuous logical addresses. In addition, each of the logical units 612(0) to 612(C) may also be mapped to one or more physical units.

The memory management circuit 502 records a mapping relation (a.k.a. a logical-to-physical address mapping relation) between the logical units and the physical units into at least one logical-to-physical address mapping table. When the host system 11 intends to read the data from the memory storage device 10 or write the data into the memory storage device 10, the memory management circuit 502 can perform a data accessing operation on the memory storage device 10 according to the logical-to-physical address mapping table.

In the present exemplary embodiment, the memory management circuit 502 senses a temperature of the memory storage device 10 by the temperature sensor 513 and obtains a temperature value. The temperature value varies with the different temperatures sensed by the temperature sensor 513. If the temperature sensed by the temperature sensor 513 is higher, the temperature value is higher. If the temperature sensed by the temperature sensor 513 is lower, the temperature value is lower. If the temperature value reflects that the current temperature of the memory storage device 10 may affect the memory storage device 10 or even damage the memory storage device 10, the memory management circuit 502 can activate a cooling-down operation. The cooling-down operation is configured to reduce the temperature of the memory storage device 10. On the other hand, if the temperature value reflects that the current temperature of the memory storage device 10 is already reduced to a reasonable temperature, the memory management circuit 502 can stop the cooling-down operation.

In the present exemplary embodiment, the cooling-down operation may be performed based on a plurality cooling-down levels. If it is assumed that the cooling-down operation can be performed based on cooling-down levels 0 to N, then a cooling-down ability of the cooling-down operation performed based on the cooling-down level 0 is lower than a cooling-down ability of the cooling-down operation performed based on the cooling-down level 1, and the cooling-down ability of the cooling-down operation performed based on the cooling-down level 1 is lower than a cooling-down ability of the cooling-down operation performed based on the cooling-down level 2. By analogy, a cooling-down ability of the cooling-down operation performed based on the cooling-down level N−1 will be lower than a cooling-down ability of the cooling-down operation performed based on the cooling-down level N. In other words, the cooling-down ability of the cooling-down operation performed based on the cooling-down level 0 is the lowest, and the cooling-down ability of the cooling-down operation performed based on the cooling-down level N is the highest. For example, N may be 10 or other positive integers, depending on actual requirements. In addition, the cooling-down ability refers to an ability for reducing the temperature of the memory storage device 10 during a time range.

In the present exemplary embodiment, after the cooling-down operation is activated, the cooling-down operation may be toggled or changed between the cooling-down levels 0 to N, so as to improve or reduce the cooling-down ability. It should be noted that, in correspondence to the improved cooling-down ability of the cooling-down operation, a system performance of the memory storage device 10 may be reduced or remained unchanged. In correspondence to the reduced cooling-down ability of the cooling-down operation, the system performance of the memory storage device 10 may be improved or remained unchanged.

In an exemplary embodiment, after the cooling-down operation is activated, the memory management circuit 502 updates a level parameter according to the cooling-down level adopted by the cooling-down operation. One level parameter corresponds to one cooling-down level. For example, a level parameter 0 may correspond to the cooling-down level 0, a level parameter 1 may correspond to the cooling-down level 1, and a level parameter n may correspond to the cooling-down level N. In correspondence to the cooling-down operation being toggled between the cooling-down levels 0 and N, the level parameter may be updated between 0 and n. If the current cooling-down operation is performed based on a cooling-down level M (M is an integer between 0 and N), the current level parameter is set to m (m is an integer between 0 and n). In an exemplary embodiment, the level parameter 0 is also known as an initial level parameter, and the cooling-down level 0 is also known as an initial cooling-down level.

In an exemplary embodiment, a correspondence relation between the level parameters and the cooling-down levels may be recorded into one cooling-down table, as shown by Table 1 below.

TABLE 1

| Flag Bit | Level Parameter | Cooling-down Level |
|---|---|---|
| 0 | 0 | 0 |
| 1 | 1 | 1 |
| 0 | 2 | 2 |
| 0 | 3 | 3 |
| 0 | 4 | 4 |
| 0 | 5 | 5 |
| 0 | 6 | 6 |

In the example of Table 1, it is assumed that N is 6, and thus the level parameters 0 to 6 correspond to the cooling-down levels 0 to 6, respectively. The flag bit is used to indicate which one of the level parameters 0 to 6 is the current level parameter. For example, at one specific time point, if the flag bit corresponding to the level parameter 1 is set to 1 (while the rest of the flag bits are all 0), it indicates that the current level parameter is the level parameter 1 (as shown in Table 1). At another time point, if the cooling-down level is raised from the original cooling-down level 1 to the cooling-down level 2, the flag bit corresponding to the cooling-down level 1 is set to 0 and the flag bit corresponding to the cooling-down level 2 is set to 1, so as to indicate that the current cooling-down operation operates at the cooling-down level 2. According to the flag bits, the memory management circuit 502 can determine which one of the level parameters 0 to 6 is the current level parameter. In addition, during a period in which the cooling-down operation is performed, this cooling-down table may be loaded into the buffer memory 510 of FIG. 5 for table query and update.

It should be noted that, the current level parameter and the cooling-down level are identified by using a marking method in which one level parameter corresponds to one flag bit in Table 1. However, in another exemplary embodiment, it is also possible that the current level parameter is recorded in one specific table or field. When it is required to adjust the cooling-down level, the memory management circuit 502 can obtain the current level parameter by checking the specific table or field. Moreover, a table format of Table 1 is merely an example. In another exemplary embodiment, the cooling-down table may also have other formats, record other information that may be used in the cooling-down operation and/or record other information regarding the cooling-down operation. For example, in an exemplary embodiment, the cooling-down table may also record system parameters used by different cooling-down operations corresponding to different cooling-down levels and the like, which are not particularly limited by the invention.

In an exemplary embodiment, it is assumed that the current level parameter is k and it is required to raise the cooling-down level of the cooling-down operation. According to the current level parameter k, a cooling-down level K currently adopted by the cooling-down operation may be updated to cooling-down level K+1, and the level parameter k is correspondingly updated to level parameter k+1. Alternatively, in an exemplary embodiment, it is assumed that the current level parameter is p and it is required to lower the cooling-down level of the cooling-down operation. According to the current level parameter p, a cooling-down level P currently adopted by the cooling-down operation may be updated to cooling-down level P−1, and the level parameter p is correspondingly updated to level parameter p−1. In other words, according to the current level parameter, the memory management circuit 502 may obtain the cooling-down level adopted by the current cooling-down operation, and accordingly raise or lower the cooling-down level of the cooling-down operation.

In an exemplary embodiment, the cooling-down operation may include various cooling-down means, such as reducing a clock frequency of the memory storage device 10, reducing an operating voltage of the memory storage device 10 and reducing a data transmission bandwidth of the memory storage device 10. If one specific cooling-down operation has higher reduction rate for the clock frequency, the operating voltage and/or the data transmission bandwidth of the memory storage device 10, the cooling-down ability of that specific cooling-down operation is usually higher. If one specific cooling-down operation has lower reduction rate for the clock frequency, the operating voltage and/or the data transmission bandwidth of the memory storage device 10, the cooling-down ability of that specific cooling-down operation is usually lower. In correspondence to the different cooling-down levels, as long as the requirement on the cooling-down ability of the corresponding cooling-down level can be satisfied, the cooling-down means adopted by the cooling-down operations may be completely identical to, partially identical to or completely different from one another.

In an exemplary embodiment, if the cooling-down operation includes reducing the data transmission bandwidth of the memory storage device 10, the memory management circuit 502 determines whether to give an instruction for writing a write data into the rewritable non-volatile memory module 406 according to whether a data amount of the write data from the host system 11 is greater than a data threshold value. For example, when receiving the write data from the host system 11, the memory management circuit 502 determines whether the data amount of the write data is greater than the data threshold value. If the data amount of the write data is not greater than the data threshold value, the memory management circuit 502 gives the instruction for indicating writing the write data into the rewritable non-volatile memory module 406.

However, if the data amount of the write data is greater than the data threshold value, the memory management circuit 502 suspends the instruction for writing the write data into the rewritable non-volatile memory module 406. For example, the memory management circuit 502 temporarily stop sending the instruction for writing data, and the write data may be temporarily stored in the buffer memory 510 of FIG. 5. Meanwhile, the memory management circuit 502 dynamically updates the data threshold value. For example, each time after one preset time is elapsed, a preset value is added to the data threshold value. After the operation of writing the write data into the rewritable non-volatile memory module 406 is suspended, at one specific time point, if the data amount of the write data is not greater than the updated data threshold value, the memory management circuit 502 gives the instruction for writing the write data into the rewritable non-volatile memory module 406.

In an exemplary embodiment, it is assumed that the data threshold value is preset to 300 MB. If the data amount of one specific write data received from the host system 11 is 200 MB (200<300), the write data may be permitted to be transmitted to the rewritable non-volatile memory module 406 for storage. However, if the data amount of one specific write data received from the host system 11 is 500 MB (500>300), the write data may be temporarily stored in the buffer memory 510 instead of being instantly transmitted to the rewritable non-volatile memory module 406. On the other hand, in correspondence to the fact that the write data is not transmitted to the rewritable non-volatile memory module 406, the data threshold value is updated. For example, after 1 millisecond (ms), the data threshold value is added with one accumulated value (e.g., 100 MB) to become 400 MB. After 2 ms, the data threshold value is added with that accumulated value (e.g., 100 MB) again to become 500 MB. In other words, after 2 ms, the data threshold value is updated to 500 MB, and the data amount of the write data temporarily stored in the buffer memory 510 is no longer greater than the data threshold value (500=500). Therefore, after 2 ms elapsed from the time that the write data is temporarily stored in the buffer memory 510, the write data may be permitted to be transmitted to the rewritable non-volatile memory module 406 for storage. In this way, a heat dissipation effect may be achieved by reducing the data transmission bandwidth of the memory storage device 10.

It should be noted that, aforesaid operation of reducing the data transmission bandwidth of the memory storage device 10 by comparing the write data with the data threshold value is merely an example of the cooling-down operation instead of a limitation to the invention. In other not-mentioned exemplary embodiments, any means capable of delaying reception of the write data, delaying storage of the write data, reducing the bandwidth for receiving data from the host system 11 and/or reducing the bandwidth for transmitting data between the memory control circuit unit 404 and the rewritable non-volatile memory module 406 may be included in the operation of reducing the data transmission bandwidth of the memory storage device 10. For example, in an exemplary embodiment, the effect of reducing the bandwidth for receiving data from the host system 11 may also be achieved by delaying transmission of a complete message corresponding to one specific data to the host system 11.

In an exemplary embodiment, the operation of reducing the clock frequency of the memory storage device 10 may include reducing a clock frequency of the memory control circuit unit 404 and/or reducing a clock frequency of the rewritable non-volatile memory module 406. Reducing the clock frequency of the rewritable non-volatile memory module 406 may further include reducing a frequency of a clock signal for programming the memory cells and/or reducing a frequency of a clock signal for reading data from the memory cells. In addition, reducing the operating voltage of the memory storage device 10 may include reducing a voltage of a supplied power of the memory control circuit unit 404 and/or reducing a voltage of a supplied power of the rewritable non-volatile memory module 406, and descriptions regarding the same are omitted herein.

Figure 7:
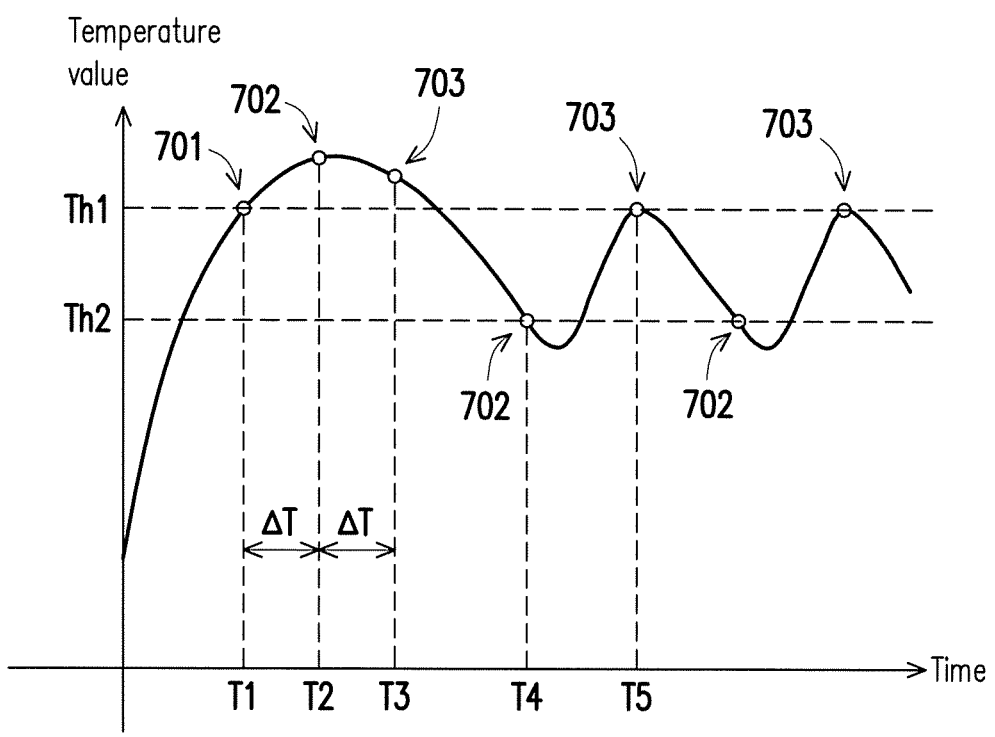
FIG. 7 is a schematic diagram illustrating the temperature value affected by the cooling-down operation according to an exemplary embodiment of the invention.

FIG. 7 is a schematic diagram illustrating the temperature value affected by the cooling-down operation according to an exemplary embodiment of the invention.

With reference to FIG. 7, in the present exemplary embodiment, threshold values Th1 and Th2 may be determined. The threshold value Th1 is also known as a first threshold value, and the threshold value Th2 is also known as a second threshold value. For example, the threshold value Th1 may be 96° C., and the threshold value Th2 may be 92° C. It is assumed that the temperature value reaches the threshold value Th1 at the time point T1. Herein, the temperature value reaching the threshold value Th1 means that the temperature value is equal to or greater than the threshold value Th1. In correspondence to the temperature value reaching the threshold value Th1, a cooling-down operation 701 is performed based on one specific cooling-down level. For example, the cooling-down operation 701 is performed based on the cooling-down level 1, and the current level parameter is set to 1.

After the cooling-down operation 701 is performed based on the cooling-down level 1, the temperature value is not reduced to being less than the threshold value Th1 during a time range ΔT. Accordingly, at the time point T2, a cooling-down operation 702 is then performed based on another cooling-down level which is higher. For example, according to the current level parameter 1, the cooling-down operation 702 may be performed based on the cooling-down level 2 and the level parameter 1 is then updated to the level parameter 2. After the cooling-down operation 702 is performed based on the cooling-down level 2, the temperature value is still not reduced to being less than the threshold value Th1 during the time range ΔT. Accordingly, at the time point T3, a cooling-down operation 703 is then performed based on another cooling-down level which is even higher. For example, according to the current level parameter 2, the cooling-down operation 703 may be performed based on the cooling-down level 3 and the level parameter 2 is then updated to the level parameter 3.

After the cooling-down operation 703 is performed based on the cooling-down level 3, the temperature value is quickly reduced to being less than the threshold value Th1 (e.g., reduced to being less than the threshold value Th1 within the time range ΔT). Accordingly, after the time point T3, the cooling-down operation 703 is continuously performed based on the cooling-down level 3 so that the temperature value continues to decline. At the time point T4, the temperature value reaches the threshold value Th2. Herein, the temperature value reaching the threshold value Th2 means that the temperature value is equal to or less than the threshold value Th2. In correspondence to the temperature value reaching the threshold value Th2, according to the current level parameter 3, the cooling-down operation 702 is performed based on the cooling-down level 2 and the level parameter 3 is updated back to the level parameter 2.

After the time point T4, the temperature value may gradually increase. At the time point T5, if the temperature value reaches the threshold value Th1 again, the cooling-down level of the cooling-down operation may be raised again. For example, according to the current level parameter 2, the cooling-down operation 703 may be performed based on the cooling-down level 3 and the level parameter 2 is then updated to the level parameter 3. Then, if the temperature value is reduced to reaching the threshold value Th2, the cooling-down level of the cooling-down operation may be lowered again. For example, according to the current level parameter 3, the cooling-down operation 702 may be performed based on the cooling-down level 2 and the level parameter 3 is correspondingly updated to the level parameter 2. By analogy, after the time point T5, the temperature value may be fluctuated between the threshold values Th1 and Th2 and may gradually be converged around an average value of the threshold values Th1 and Th2.

Figure 8:
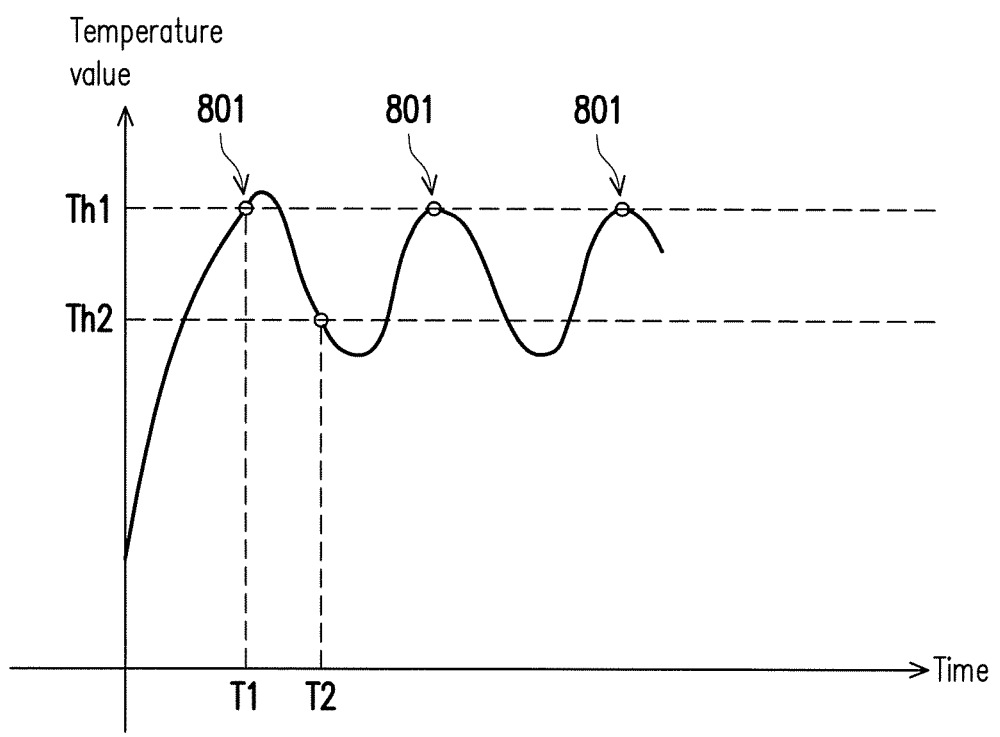
FIG. 8 is a schematic diagram illustrating the temperature value affected by the cooling-down operation according to another exemplary embodiment of the invention.

FIG. 8 is a schematic diagram illustrating the temperature value affected by the cooling-down operation according to another exemplary embodiment of the invention.

With reference to FIG. 8, it is assumed that the temperature value reaches the threshold value Th1 at the time point T1. In correspondence to the temperature value reaching the threshold value Th1, a cooling-down operation 801 is performed based on one specific cooling-down level. In the present exemplary embodiment, the cooling-down operation 801 is performed based on the cooling-down level 0, and the current level parameter is set to 0. It should be noted that, the cooling-down level 0 is the lowest cooling-down level. After the cooling-down operation 801 is performed based on the cooling-down level 0, it is assumed that the temperature value is quickly reduced to being less than the threshold value Th1 (e.g., reduced to being less than the threshold value Th1 during the time range ΔT). Accordingly, after the time point T1, the cooling-down operation 801 is continuously performed based on the cooling-down level 0 so that the temperature value continues to decline.

At the time point T2, the temperature value reaches the threshold value Th2. In correspondence to the temperature value reaching the threshold value Th2, the cooling-down operation may be stopped. After the cooling-down operation is stopped, the temperature value may gradually increase. If the temperature value reaches the threshold value Th1 again, the cooling-down operation 801 may be performed based on the cooling-down level 0 again, and the current level parameter is set to 0. By analogy, the temperature value may be fluctuated between the threshold values Th1 and Th2 continuously and may gradually be converged to the average value of the threshold values Th1 and Th2.

Figure 9:
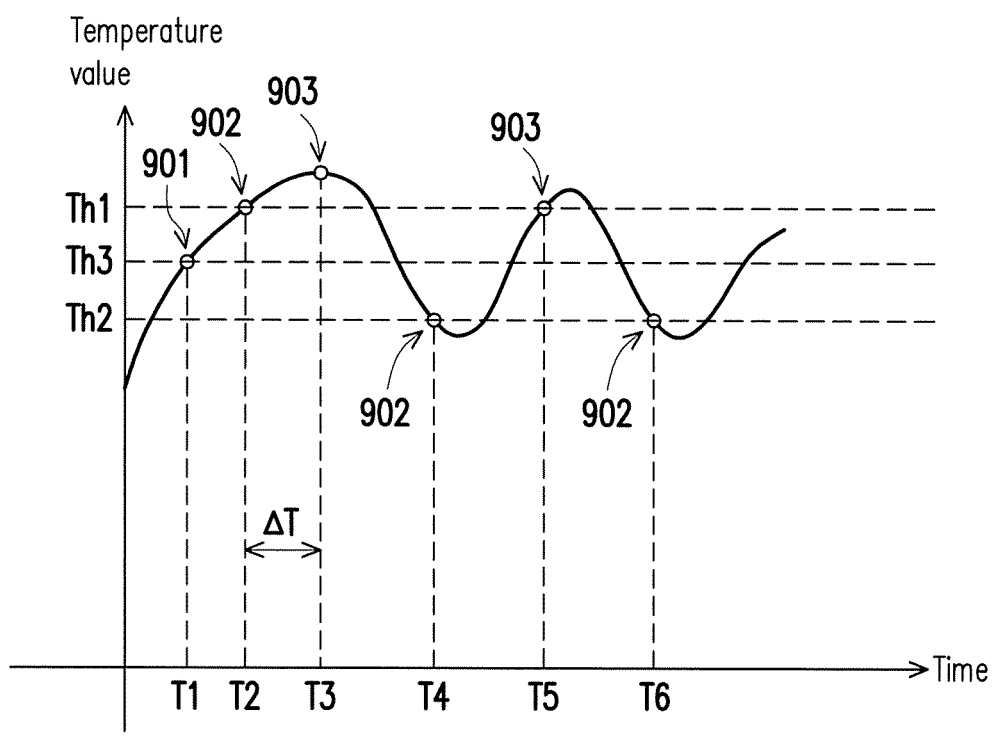
FIG. 9 is a schematic diagram illustrating the temperature value affected by the cooling-down operation according to another exemplary embodiment of the invention.

FIG. 9 is a schematic diagram illustrating the temperature value affected by the cooling-down operation according to another exemplary embodiment of the invention.

With reference to FIG. 9, in the present exemplary embodiment, threshold values Th1, Th2 and Th3 may be determined. The threshold value Th3 is between the threshold values Th1 and Th2. For example, the threshold value Th3 may be the average value of the threshold values Th1 and Th2 or other values. For example, the threshold value Th1, Th2 and Th3 may be 96° C., 92° C. and 94° C., respectively. In the present exemplary embodiment, the threshold value Th1 is also known as the first threshold value, the threshold value Th2 is also known as the second threshold value, and the threshold value Th3 is also known as a third threshold value.

It is assumed that the temperature reaches the threshold value Th3 at the time point T1. Herein, the temperature value reaching the threshold value Th3 means that the temperature value is equal to or greater than the threshold value Th3. In correspondence to the temperature value reaching the threshold value Th3, a cooling-down operation 901 is performed based on one specific cooling-down level. In the present exemplary embodiment, the third threshold Th3 is configured to activate the cooling-down operation. Therefore, in correspondence to the temperature value reaching the threshold value Th3, the corresponding cooling-down operation 901 is performed based on the cooling-down level 0, and the current level parameter is set to 0. However, in another exemplary embodiment, before the temperature value reaches the threshold value Th3, the cooling-down operation may also be activated (e.g., activated when the temperature value is equal to or higher than the threshold value Th2), and the invention is not limited thereto.

After the cooling-down operation 901 is performed based on the cooling-down level 0, if the temperature value is still raised to reach the threshold value Th1, a cooling-down operation 902 is then performed based another cooling-down level which is higher. For example, according to the current level parameter 0, the cooling-down operation 902 may be performed based on the cooling-down level 1 and the level parameter 0 is then updated to the level parameter 1. After the cooling-down operation 902 is performed based on the cooling-down level 1, the temperature value is not reduced to being less than the threshold value Th1 during the time range ΔT. Accordingly, after the time point T3, a cooling-down operation 903 is then performed based on another cooling-down level which is even higher. For example, according to the current level parameter 1, the cooling-down operation 903 may be performed based on the cooling-down level 2 and the level parameter 1 is then updated to the level parameter 2.

After the time point T3, the temperature value is quickly reduced to being less than the threshold value Th1 (e.g., reduced to being less than the threshold value Th1 during the time range ΔT). Therefore, the cooling-down operation 903 is continuously performed based on the cooling-down level 2 so that the temperature value continues to decline. At the time point T4, the temperature value reaches the threshold value Th2. In correspondence to the temperature value reaching the threshold value Th2, the cooling-down level of the cooling-down operation may be lowered. For example, according to the current level parameter 2, the cooling-down operation 902 may be performed again based on the cooling-down level 1 and the level parameter 2 is updated to the level parameter 1. After the time point T4, the temperature value may gradually increase.

At the time point T5, if the temperature value reaches the threshold value Th1 again, the cooling-down level of the cooling-down operation may be raised again. For example, according to the current level parameter 1, the cooling-down operation 903 may be performed again based on the cooling-down level 2 and the level parameter 1 is then updated to the level parameter 2. Then, at the time point T6, if the temperature value is reduced to reaching the threshold value Th2, the cooling-down level of the cooling-down operation may be lowered again. For example, according to the current level parameter 2, the cooling-down operation 902 may be performed again based on the cooling-down level 1 and the level parameter 2 is then updated to the level parameter 1. By analogy, after the time point T6, the temperature value may be fluctuated between the threshold values Th1 and Th2 and may gradually be converged around the average value of the threshold values Th1 and Th2 (e.g., the threshold value Th3).

Figure 10:
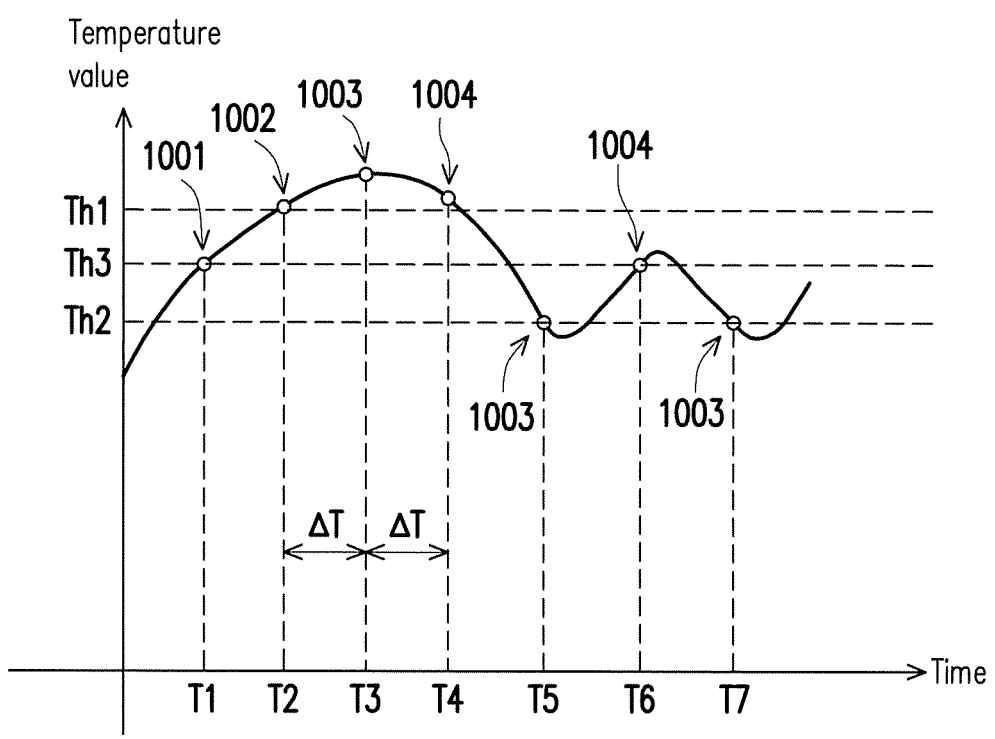
FIG. 10 is a schematic diagram illustrating the temperature value affected by the cooling-down operation according to another exemplary embodiment of the invention.

FIG. 10 is a schematic diagram illustrating the temperature value affected by the cooling-down operation according to another exemplary embodiment of the invention.

With reference to FIG. 10, it is assumed that the temperature reaches the threshold value Th3 at the time point T1. In correspondence to the temperature value reaching the threshold value Th3, the cooling-down operation may be activated. For example, a cooling-down operation 1001 may be performed based on the cooling-down level 0, and the current level parameter is set to 0. However, in another exemplary embodiment, before the temperature value reaches the threshold value Th3, the cooling-down operation may also be previously activated, and the invention is not limited thereto.

After the cooling-down operation 1001 is performed based on the cooling-down level 0, if the temperature value is still raised to reach the threshold value Th1, a cooling-down operation 1002 is then performed based another cooling-down level which is higher. For example, according to the current level parameter 0, the cooling-down operation 1002 may be performed based on the cooling-down level 1 and the level parameter 0 is then updated to the level parameter 1. After the cooling-down operation 1002 is performed based on the cooling-down level 1, the temperature value is not reduced to being less than the threshold value Th1 during the time range ΔT. Accordingly, after the time point T3, a cooling-down operation 1003 is then performed based on another cooling-down level which is even higher. For example, according to the current level parameter 1, the cooling-down operation 1003 may be performed based on the cooling-down level 2 and the level parameter 1 is then updated to the level parameter 2.

After the time point T3, although the temperature value is reduced, the temperature value is still not reduced to being less than the threshold value Th1 during the time range ΔT. Accordingly, after the time point T4, a cooling-down operation 1004 is then performed based on another cooling-down level which is even higher. For example, according to the current level parameter 2, the cooling-down operation 1004 may be performed based on the cooling-down level 3 and the level parameter 2 is then updated to the level parameter 3.

After the time point T4, the temperature value is quickly reduced to being less than the threshold value Th1 (e.g., reduced to being less than the threshold value Th1 during the time range ΔT). Therefore, the cooling-down operation 1004 is continuously performed based on the cooling-down level 3 so that the temperature value continues to decline. At the time point T5, the temperature value reaches the threshold value Th2. In correspondence to the temperature value reaching the threshold value Th2, the cooling-down level of the cooling-down operation may be lowered. For example, according to the current level parameter 3, the cooling-down operation 1003 may be performed again based on the cooling-down level 2 and the level parameter 3 is updated to the level parameter 2. After the time point T5, the temperature value may gradually increase.

At the time point T6, the temperature value reaches the threshold value Th3. In correspondence to the temperature value reaching the threshold value Th3, the cooling-down level of the cooling-down operation may be raised. For example, after the time point T6, according to the current level parameter 2, the cooling-down operation 1004 may be performed based on the cooling-down level 3 and the level parameter 2 is correspondingly updated to the level parameter 3. Then, at the time point T7, if the temperature value is reduced to the threshold value Th2, the cooling-down level of the cooling-down operation may be lowered again. For example, according to the current level parameter 3, the cooling-down operation 1003 may be performed again based on the cooling-down level 2 and the level parameter 3 is then updated to the level parameter 2. By analogy, after the time point T7, the temperature value may be fluctuated between the threshold values Th2 and Th3 and may gradually be converged around the average value of the threshold values Th2 and Th3.

It should be noted that, in the exemplary embodiments of FIG. 7 to FIG. 10, it is assumed that the temperature of the memory storage device 10 is raised or reduced only because of the cooling-down operation and thus the temperature value will be gradually be converged to fall between the threshold values Th1 and Th2 (or the threshold values Th2 and Th3). In some not-mentioned exemplary embodiments, the temperature of the memory storage device 10 may also be naturally reduced because the external ambient temperature drops, the memory storage device 10 stops performing the data access operation, or the memory storage device 10 enters an idle state. Under the circumstance where the detected temperature value is gradually reduced, the cooling-down level adopted by the cooling-down operation may also be gradually lowered or the cooling-down operation may even be stopped. Alternatively, in an exemplary embodiment, if the temperature value is less than another threshold value (also known as a fourth threshold value), the cooling-down operation may also be (directly) stopped. Here, the fourth threshold value is less than the second threshold value.

In the foregoing exemplary embodiments of FIG. 7 to FIG. 9, the threshold value Th1 is used as a trigger point for raising the cooling-down level of the cooling-down operation, and the threshold value Th2 is used as a trigger point for lowering the cooling-down level of the cooling-down operation. If the temperature value is not reduced to being less than the threshold value Th1 during a time range (e.g., the time range ΔT), the cooling-down level of the cooling-down operation is then raised by one level. In one exemplary embodiment, if the temperature value is not raised to being greater than the threshold value Th2 during a time range (e.g., the time range ΔT), the cooling-down level of the cooling-down operation is then lowered by one level. For example, in an exemplary embodiment of FIG. 10, after the time point T7, if the temperature value is not raised to being greater than the threshold value Th2 (e.g., the temperature value continues to decline), each time when a preset time range (e.g., the time range ΔT) is elapsed, the cooling-down level of the cooling-down operation is lowered by one level (e.g., lowered from the cooling-down level 2 to the cooling-down level 1, or lowered from the cooling-down level 1 to the cooling-down level 0). If the cooling-down level is 0 and the temperature value continues to decline (or the temperature value is not raised to the threshold value Th2), the cooling-down operation may be stopped.

In the foregoing exemplary embodiment of FIG. 9, the threshold value Th3 is used as a trigger point for activating the cooling-down operation, and the threshold values Th1 and Th2 are respectively used as trigger points for raising and lowering the cooling-down level of the cooling-down operation after the cooling-down operation is activated. However, in the foregoing exemplary embodiment of FIG. 10, other than being used as the trigger point for activating the cooling-down operation, the threshold value Th3 may also be used as a trigger point for raising the cooling-down level. Alternatively, in a not-mentioned exemplary embodiment, the threshold value Th3 may also be used as a trigger point for lowering the cooling-down level of the cooling-down operation. For example, in the exemplary embodiment where the threshold value Th3 is used as the trigger point for lowering the cooling-down level, when the temperature value is less than the threshold value Th3, the cooling-down level of the cooling-down operation may be lowered.

In an exemplary embodiment, even if the temperature value is reduced to being less than the first threshold value during the preset time range, the cooling-down level of the cooling-down operation will be raised if the temperature value reaches the first threshold value again. For example, in an exemplary embodiment of FIG. 7, after the time point T3, the cooling-down operation 703 is performed based on the cooling-down level 3. However, after the time point T3, if the temperature value is reduced to less than the threshold Th1 during a preset time range (e.g., the time range ΔT) and is then raised to the threshold value Th1 before reaching the threshold value Th2, the cooling-down level of the cooling-down operation may then be raised (raised from the cooling-down level 3 to the cooling-down level 4). Alternatively, in an exemplary embodiment of FIG. 7, after the time point T4, the cooling-down operation 702 is performed based on the cooling-down level 2. However, after the time point T4, if the temperature value is raised to being greater than the threshold value Th2 during a preset time range (e.g., the time range ΔT) and is then reduced to being less than the threshold value Th2 before reaching the threshold value Th1, the cooling-down level of the cooling-down operation may be lowered (lowered from the cooling-down level 2 to the cooling-down level 1).

It should be noted that, in the foregoing exemplary embodiments, the cooling-down level is adjusted each time with one level as an adjustment unit. However, in an exemplary embodiment, the cooling-down level may also be raised by multiple levels at one time (e.g., raised from the cooling-down level 0 to the cooling-down level 3), and/or the cooling-down level may also be lowered by multiple levels at one time (e.g., lowered from the cooling-down level 4 to the cooling-down level 2), and the invention is not limited thereto.

In an exemplary embodiment, a rising rate of the temperature rate may be detected. If the rising rate of the temperature rate is higher than a preset rate (e.g., when a rising amount of the temperature value within a time unit is higher than a preset amount), when it is determined that the cooling-down level needs to be raised, the cooling-down level may be raised by multiple levels (e.g., 2 levels or 3 levels) at one time. In an exemplary embodiment, the number of the levels to be raised for the cooling-down level may also be determined according to the rising rate of the temperature value. If the rising rate of the temperature value is higher, the number of levels raised for the cooling-down level at one time is also greater. In other words, the number of levels raised for the cooling-down level at one time may be positively correlated to the rising rate of the temperature value.

In an exemplary embodiment, a falling rate of the temperature rate may also be detected. If the falling rate of the temperature rate is higher than a preset rate (e.g., when a falling amount of the temperature value within a time unit is higher than a preset amount), when it is determined that the cooling-down level needs to be lowered, the cooling-down level may also be lowered by multiple levels (e.g., 2 levels or 3 levels) at one time. In an exemplary embodiment, the number of the levels lowered for the cooling-down level may also be determined according to the falling rate of the temperature value. If the falling rate of the temperature value is higher, the number of levels lowered for the cooling-down level at one time is also greater. In other words, the number of levels lowered for the cooling-down level at one time may be positively correlated to the falling rate of the temperature value.

It should be noted that, although there are various adjustment mechanisms and implementation details proposed for the cooling-down level of the cooling-down operation in the foregoing exemplary embodiments, the invention is not limited. In some not-mentioned exemplary embodiments, as long as the cooling-down level of one specific cooling-down operation is not a fixed level determined according to certain preset temperature range where the temperature value is current in, and/or the cooling-down level of one specific cooling-down operation is raised or lowered according to a comparison result between the temperature value and one (single) threshold value, that specific cooling-down operation falls within the scope of the invention.

Figure 11:
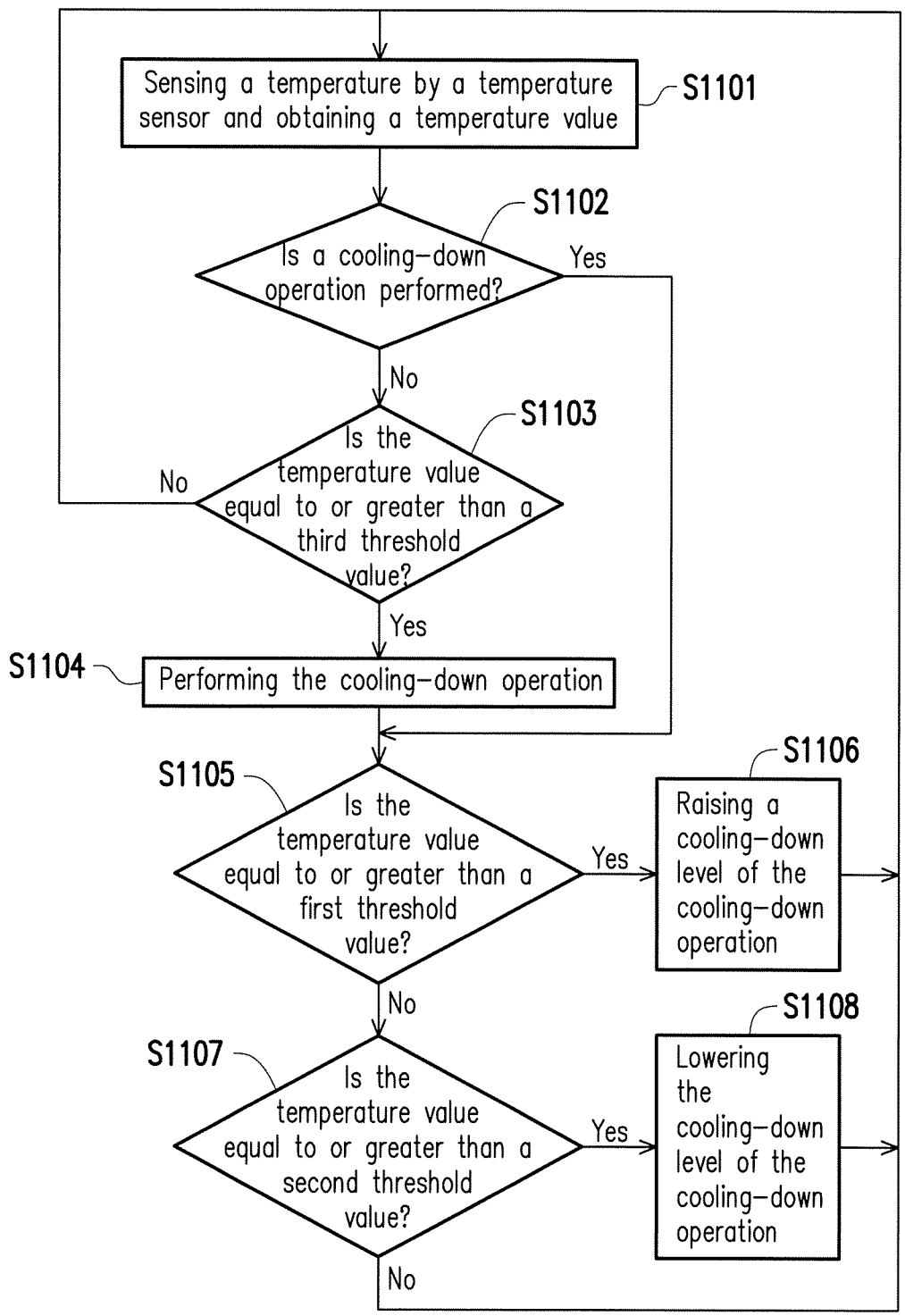
FIG. 11 is a flowchart illustrating a temperature control method according to an exemplary embodiment of the invention.

FIG. 11 is a flowchart illustrating a temperature control method according to an exemplary embodiment of the invention.

With reference to FIG. 11, in step S1101, a temperature is sensed by a temperature sensor and a temperature value is obtained. In step S1102, whether a cooling-down operation is performed (or activated) is determined. If the cooling-down operation is performed (or activated), the method proceeds to step S1105. If the cooling-down operation is not performed (or not activated), in step S1103, whether the temperature value is equal to or greater than a third threshold value is determined. If the temperature value is not equal to or greater than the third threshold value, the method returns to step S1101. If the temperature value is equal to or greater than the third threshold value, in step S1104, the cooling-down operation is performed (or activated).

In step S1105, whether the temperature value is equal to or greater than a first threshold value is determined. If the temperature value is equal to or greater than the first threshold value, in step S1106, a cooling-down level of the cooling-down operation is raised to improve a cooling-down ability of the cooling-down operation. After step S1106, the method returns to step S1101. If the temperature value is not equal to or greater than the first threshold value, in step S1107, whether the temperature value is equal to or less than a second threshold value is determined. If the temperature value is equal to or less than the second threshold value, in step S1108, the cooling-down level of the cooling-down operation is lowered to reduce the cooling-down ability of the cooling-down operation. After step S1108, the method returns to step S1101. In addition, the method also returns to step S1101 if the determination in step S1107 is "No".

Nevertheless, steps depicted in FIG. 11 are described in detail as above so that related description thereof is omitted hereinafter. It should be noted that, the steps depicted in FIG. 11 may be implemented as a plurality of program codes or circuits, which are not particularly limited in the invention. Moreover, the method disclosed in FIG. 11 may be implemented by reference with above exemplary embodiments, or may be implemented separately, which are not particularly limited in the invention. For example, steps S1101 to S1108 may also be executed by the memory management circuit 502 or the memory control circuit unit 404 of FIG. 5.

In summary, when it is determined that the cooling-down operation needs to be performed in order to reduce the temperature of the memory storage device, whether to raise or lower the cooling-down level of the cooling-down operation is determined not according to one fixed level determined by certain temperature range where the temperature value is currently in, but according to the comparison result between the detected temperature value and at least one threshold value. Accordingly, in the temperature range(s) defined by the first threshold value and the second threshold value, the cooling-down level of the performed cooling-down operation may be dynamically determined. As a result, a balance between the cooling-down ability and the system performance of the memory storage device may be achieved.

The previously described exemplary embodiments of the present disclosure have the advantages aforementioned, wherein the advantages aforementioned not required in all versions of the disclosure.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A temperature control method for a memory control circuit unit, wherein the memory control circuit unit is configured to control a rewritable non-volatile memory module, and the temperature control method comprises:
   sensing a temperature by a temperature sensor and obtaining a temperature value;
   performing a cooling-down operation based on a first cooling-down level and updating a level parameter to a first level parameter if the temperature value reaches a first threshold value, wherein the first level parameter corresponds to the first cooling-down level;
   changing, according to the first level parameter, to perform the cooling-down operation based on a second cooling-down level and updating the level parameter from the first level parameter to a second level parameter if the temperature value is not reduced to being less than the first threshold value during a first time range after the cooling-down operation is performed based on the first cooling-down level, wherein the second level parameter corresponds to the second cooling-down level,
   wherein a cooling-down ability of the cooling-down operation performed based on the second cooling-down level is higher than a cooling-down ability of the cooling-down operation performed based on the first cooling-down level, and triggering for raising a cooling-down level of the cooling-down operation from the first cooling-down level to the second cooling-down level is that the temperature value is not reduced to being less than the first threshold value during the first time range after the cooling-down operation is performed based on the first cooling-down level,
   continue sensing the temperature if the temperature value is reduced to being less than a second threshold value after the cooling-down operation is performed based on the second cooling-down level,
   changing, according to the second level parameter, to perform the cooling-down operation based on a fourth cooling-down level and lowering the level parameter from the second level parameter to a fourth level parameter if a preset time range elapses and the temperature value is not raised to being greater than the second threshold value after the cooling-down operation is performed based on the second cooling-down level,
   wherein the second threshold value is less than the first threshold value,
   wherein the cooling-down ability of the cooling-down operation performed based on the second cooling-down level is higher than a cooling-down ability of the cooling-down operation performed based on the fourth cooling-down level.

2. The temperature control method according to claim 1, further comprising:
   changing back, according to the second level parameter, to perform the cooling-down operation based on the first cooling-down level and updating the level parameter from the second level parameter to the first level parameter if the temperature value is reduced to being less than the first threshold value during a second time range and the temperature value reaches the second threshold value after the cooling-down operation is performed based on the second cooling-down level.

3. The temperature control method according to claim 1, further comprising:
   continuing to perform the cooling-down operation based on the second cooling-down level if the temperature value is reduced to being less than the first threshold value during a second time range and the temperature value does not reach the second threshold value after the cooling-down operation is performed based on the second cooling-down level.

4. The temperature control method according to claim 1, further comprising:
   changing, according to the second level parameter, to perform the cooling-down operation based on a third cooling-down level and updating the level parameter from the second level parameter to a third level parameter if the temperature value is reduced to being less than the first threshold value during a second time range and then raised to the first threshold value after the cooling-down operation is performed based on the second cooling-down level, wherein the third level parameter corresponds to the third cooling-down level,
   wherein a cooling-down ability of the cooling-down operation performed based on the third cooling-down level is higher than the cooling-down ability of the cooling-down operation performed based on the second cooling-down level,
   wherein triggering for raising the cooling-down ability of the cooling-down operation from the second cooling-down level to the third cooling-down level is that after the cooling-down operation is performed based on the second cooling-down level, the temperature value is reduced to being less than the first threshold value during the second time range and then raised to the first threshold value.

5. The temperature control method according to claim 1, further comprising:
continuing to perform the cooling-down operation based on the first cooling-down level if the temperature value is reduced to being less than the first threshold value during the first time range and the temperature value does not reach the second threshold value after the cooling-down operation is performed based on the first cooling-down level.

6. The temperature control method according to claim 1, further comprising:
performing the cooling-down operation based on an initial cooling-down level and updating the level parameter to an initial level parameter if the temperature value reaches a third threshold value before the cooling-down operation is performed based on the first cooling-down level, wherein the initial level parameter corresponds to the initial cooling-down level,
wherein the third threshold value is between the first threshold value and the second threshold value.

7. The temperature control method according to claim 1, wherein the cooling-down operation comprises:
determining whether to give an instruction for writing a write data into the rewritable non-volatile memory module according to whether a data amount of the write data is greater than a data threshold value.

8. The temperature control method according to claim 7, wherein the step of determining whether to give the instruction for writing the write data into the rewritable non-volatile memory module according to whether the data amount of the write data is greater than the data threshold value comprises:
suspending the instruction for writing the write data into the rewritable non-volatile memory module if the data amount of the write data is greater than the data threshold value;
dynamically updating the data threshold value; and
giving the instruction for writing the write data into the rewritable non-volatile memory module if the data amount of the write data is not greater than the data threshold value.

9. A memory storage device, comprising:
a connection interface unit, configured to couple to a host system;
a rewritable non-volatile memory module;
a temperature sensor; and
a memory control circuit unit, coupled to the connection interface unit, the rewritable non-volatile memory module and the temperature sensor,
wherein the memory control circuit unit is configured to sense a temperature by the temperature sensor and obtain a temperature value,
wherein the memory control circuit unit is further configured to perform a cooling-down operation based on a first cooling-down level and update a level parameter to a first level parameter if the temperature value reaches a first threshold value, wherein the first level parameter corresponds to the first cooling-down level,
wherein the memory control circuit unit is further configured to change, according to the first level parameter, to perform the cooling-down operation based on a second cooling-down level and update the level parameter from the first level parameter to a second level parameter if the temperature value is not reduced to being less than the first threshold value during a first time range after the cooling-down operation is performed based on the first cooling-down level, wherein the second level parameter corresponds to the second cooling-down level,
wherein a cooling-down ability of the cooling-down operation performed based on the second cooling-down level is higher than a cooling-down ability of the cooling-down operation performed based on the first cooling-down level, and triggering for raising a cooling-down level of the cooling-down operation from the first cooling-down level to the second cooling-down level is that the temperature value is not reduced to being less than the first threshold value during the first time range after the cooling-down operation is performed based on the first cooling-down level,
wherein the memory control circuit unit is further configured to continue sensing the temperature if the temperature value is reduced to being less than a second threshold value after the cooling-down operation is performed based on the second cooling-down level,
wherein the memory control circuit unit is further configured to change, according to the second level parameter, to perform the cooling-down operation based on a fourth cooling-down level and lowering the level parameter from the second level parameter to a fourth level parameter if a preset time range elapses and the temperature value is not raised to being greater than the second threshold value after the cooling-down operation is performed based on the second cooling-down level,
wherein the second threshold value is less than the first threshold value,
wherein the cooling-down ability of the cooling-down operation performed based on the second cooling-down level is higher than a cooling-down ability of the cooling-down operation performed based on the fourth cooling-down level.

10. The memory storage device according to claim 9, wherein the memory control circuit unit is further configured to change back, according to the second level parameter, to perform the cooling-down operation based on the first cooling-down level and update the level parameter from the second level parameter to the first level parameter if the temperature value is reduced to being less than the first threshold value during a second time range and the temperature value reaches the second threshold value after the cooling-down operation is performed based on the second cooling-down level.

11. The memory storage device according to claim 9, wherein the memory control circuit unit is further configured to continue to perform the cooling-down operation based on the second cooling-down level if the temperature value is reduced to being less than the first threshold value during a second time range and the temperature value does not reach the second threshold value after the cooling-down operation is performed based on the second cooling-down level.

12. The memory storage device according to claim 9, wherein the memory control circuit unit is further configured to change, according to the second level parameter, to perform the cooling-down operation based on a third cooling-down level and update the level parameter from the second level parameter to a third level parameter if the temperature value is reduced to being less than the first threshold value during a second time range and then raised to the first threshold value after the cooling-down operation is performed based on the second cooling-down level, wherein the third level parameter corresponds to the third cooling-down level,
 wherein a cooling-down ability of the cooling-down operation performed based on the third cooling-down level is higher than the cooling-down ability of the cooling-down operation performed based on the second cooling-down level,
 wherein triggering for raising the cooling-down ability of the cooling-down operation from the second cooling-down level to the third cooling-down level is that after the cooling-down operation is performed based on the second cooling-down level, the temperature value is reduced to being less than the first threshold value during the second time range and then raised to the first threshold value.

13. The memory storage device according to claim 9, wherein the memory control circuit unit is further configured to continue to perform the cooling-down operation based on the first cooling-down level if the temperature value is reduced to being less than the first threshold value during the first time range and the temperature value does not reach the second threshold value after the cooling-down operation is performed based on the first cooling-down level.

14. The memory storage device according to claim 9, wherein the memory control circuit unit is further configured to perform the cooling-down operation based on an initial cooling-down level and update the level parameter to an initial level parameter if the temperature value reaches a third threshold value before the cooling-down operation is performed based on the first cooling-down level, wherein the initial level parameter corresponds to the initial cooling-down level,
 wherein the third threshold value is between the first threshold value and the second threshold value.

15. The memory storage device according to claim 9, wherein the memory control circuit unit is further configured to determine whether to give an instruction for writing a write data into the rewritable non-volatile memory module according to whether a data amount of the write data is greater than a data threshold value in the cooling-down operation.

16. The memory storage device according to claim 15, wherein the operation of determining whether to give the instruction for writing the write data into the rewritable non-volatile memory module by the memory control circuit unit according to whether the data amount of the write data is greater than the data threshold value comprises:
 suspending the instruction for writing the write data into the rewritable non-volatile memory module if the data amount of the write data is greater than the data threshold value;
 dynamically updating the data threshold value; and
 giving the instruction for writing the write data into the rewritable non-volatile memory module if the data amount of the write data is not greater than the data threshold value.

17. A memory control circuit unit for controlling a rewritable non-volatile memory module, the memory control circuit unit comprises:
 a host interface configured to couple to a host system;
 a memory interface, configured to couple to the rewritable non-volatile memory module;
 a temperature sensor; and
 a memory management circuit, coupled to the host interface, the memory interface and the temperature sensor,
 wherein the memory management circuit is configured to sense a temperature by the temperature sensor and obtain a temperature value,
 wherein the memory management circuit is further configured to perform a cooling-down operation based on a first cooling-down level and update a level parameter to a first level parameter if the temperature value reaches a first threshold value, wherein the first level parameter corresponds to the first cooling-down level,
 wherein the memory management circuit is further configured to change, according to the first level parameter, to perform the cooling-down operation based on a second cooling-down level and update the level parameter from the first level parameter to a second level parameter if the temperature value is not reduced to being less than the first threshold value during a first time range after the cooling-down operation is performed based on the first cooling-down level, wherein the second level parameter corresponds to the second cooling-down level,
 wherein a cooling-down ability of the cooling-down operation performed based on the second cooling-down level is higher than a cooling-down ability of the cooling-down operation performed based on the first cooling-down level, and triggering for raising a cooling-down level of the cooling-down operation from the first cooling-down level to the second cooling-down level is that the temperature value is not reduced to being less than the first threshold value during the first time range after the cooling-down operation is performed based on the first cooling-down level,
 wherein the memory management circuit is further configured to continue sensing the temperature if the temperature value is reduced to being less than a second threshold value after the cooling-down operation is performed based on the second cooling-down level,
 wherein the memory management circuit is further configured to change, according to the second level parameter, to perform the cooling-down operation based on a fourth cooling-down level and lowering the level parameter from the second level parameter to a fourth level parameter if a preset time range elapses and the temperature value is not raised to being greater than the second threshold value after the cooling-down operation is performed based on the second cooling-down level,
 wherein the second threshold value is less than the first threshold value,
 wherein the cooling-down ability of the cooling-down operation performed based on the second cooling-down level is higher than a cooling-down ability of the cooling-down operation performed based on the fourth cooling-down level.

18. The memory control circuit unit according to claim 17, wherein the memory management circuit is further configured to change, according to the second level parameter, to perform the cooling-down operation based on the first cooling-down level and update the level parameter from the second level parameter to the first level parameter if the temperature value is reduced to being less than the first threshold value during a second time range and the temperature value reaches the second threshold value after the cooling-down operation is performed based on the second cooling-down level.

19. The memory control circuit unit according to claim 17, wherein the memory management circuit is further configured to continue to perform the cooling-down operation based on the second cooling-down level if the temperature value is reduced to being less than the first threshold value during a second time range and the temperature value does not reach the second threshold value after the cooling-down operation is performed based on the second cooling-down level.

20. The memory control circuit unit according to claim 17, wherein the memory management circuit is further configured to change, according to the second level parameter, to perform the cooling-down operation based on a third cooling-down level and update the level parameter from the second level parameter to a third level parameter if the temperature value is reduced to being less than the first threshold value during a second time range and then raised to the first threshold value after the cooling-down operation is performed based on the second cooling-down level, wherein the third level parameter corresponds to the third cooling-down level, wherein a cooling-down ability of the cooling-down operation performed based on the third cooling-down level is higher than the cooling-down ability of the cooling-down operation performed based on the second cooling-down level, wherein triggering for raising the cooling-down ability of the cooling-down operation from the second cooling-down level to the third cooling-down level is that after the cooling-down operation is performed based on the second cooling-down level, the temperature value is reduced to being less than the first threshold value during the second time range and then raised to the first threshold value.

21. The memory control circuit unit according to claim 17, wherein the memory management circuit is further configured to continue to perform the cooling-down operation based on the first cooling-down level if the temperature value is reduced to being less than the first threshold value during the first time range and the temperature value does not reach the second threshold value after the cooling-down operation is performed based on the first cooling-down level.

22. The memory control circuit unit according to claim 17, wherein the memory management circuit is further configured to perform the cooling-down operation based on an initial cooling-down level and update the level parameter to an initial level parameter if the temperature value reaches a third threshold value before the cooling-down operation is performed based on the first cooling-down level, wherein the initial level parameter corresponds to the initial cooling-down level, wherein the third threshold value is between the first threshold value and the second threshold value.

23. The memory control circuit unit according to claim 17, wherein the memory management circuit is further configured to determine whether to give an instruction for writing a write data into the rewritable non-volatile memory module according to whether a data amount of the write data is greater than a data threshold value in the cooling-down operation.

24. The memory control circuit unit according to claim 23, wherein the operation of determining whether to give the instruction for writing the write data into the rewritable non-volatile memory module by the memory management circuit according to whether the data amount of the write data is greater than the data threshold value comprises:

suspending the instruction for writing the write data into the rewritable non-volatile memory module if the data amount of the write data is greater than the data threshold value;

dynamically updating the data threshold value; and giving the instruction for writing the write data into the rewritable non-volatile memory module if the data amount of the write data is not greater than the data threshold value.

* * * * *